US009852077B2

(12) United States Patent
Patil et al.

(10) Patent No.: US 9,852,077 B2
(45) Date of Patent: Dec. 26, 2017

(54) PRESERVING USER CHANGES TO A SHARED LAYERED RESOURCE

(71) Applicant: Dell Products L.P., Round Rock, TX (US)

(72) Inventors: Rushikesh P. Patil, Sunnyvale, CA (US); Puneet Kaushik, Fremont, CA (US); Satya Mylvara, Sunnyvale, CA (US); Manmeet S. Bindra, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 63 days.

(21) Appl. No.: 14/864,465

(22) Filed: Sep. 24, 2015

(65) Prior Publication Data

US 2016/0342520 A1 Nov. 24, 2016

Related U.S. Application Data

(63) Continuation-in-part of application No. 14/719,248, filed on May 21, 2015.

(51) Int. Cl.
G06F 11/20 (2006.01)
G06F 12/0871 (2016.01)
G06F 12/0875 (2016.01)
G06F 12/0866 (2016.01)
G06F 17/30 (2006.01)

(52) U.S. Cl.
CPC ...... *G06F 12/0871* (2013.01); *G06F 12/0866* (2013.01); *G06F 12/0875* (2013.01); *G06F 17/30067* (2013.01); *G06F 2212/314* (2013.01); *G06F 2212/604* (2013.01)

(58) Field of Classification Search
None
See application file for complete search history.

(56) References Cited

U.S. PATENT DOCUMENTS

| 8,224,789 | B1 | 7/2012 | Caklovic | |
|---|---|---|---|---|
| 2002/0078335 | A1 | 6/2002 | Cabrera et al. | |
| 2003/0233489 | A1* | 12/2003 | Blaser | G06F 8/61 719/328 |
| 2008/0005133 | A1* | 1/2008 | Khalidi | G06F 17/30235 |
| 2010/0229169 | A1* | 9/2010 | Bunnell | G06F 9/455 718/1 |
| 2012/0060004 | A1* | 3/2012 | Rope | G06F 3/0623 711/154 |
| 2012/0110570 | A1 | 5/2012 | Jacobson et al. | |
| 2012/0331225 | A1 | 12/2012 | Jones et al. | |
| 2016/0342621 | A1 | 11/2016 | Mylvara et al. | |

* cited by examiner

*Primary Examiner* — Duc Doan
(74) *Attorney, Agent, or Firm* — Baker Botts L.L.P.

(57) ABSTRACT

User changes may be preserved across updates to a layer. When a layering client mounts a layer, a corresponding layering write cache is mounted. Changes to layered resources, such as files, registry entries, and registry values, are made only to the layering write cache. A request to create a file in the layer is directed to the layering write cache such that the new file is created in the layering write cache. A request to open a layered resource, is directed to the layered resource if the layered resource is in the layering write cache. A request to write to a layered resource is directed to the layering write cache if the layered resource is in the layering write cache. If the layered resource is not in the layering write cache, the layered resource is copied to the layering write cache before redirecting the write request.

20 Claims, 3 Drawing Sheets

PRESERVING USER CHANGES TO A SHARED LAYERED RESOURCE

PRIORITY

This application is a continuation-in-part under 35 U.S.C. §120 of U.S. patent application Ser. No. 14/719,248, filed May 21, 2015.

TECHNICAL FIELD

This disclosure relates generally to information handling systems and, more particularly, to providing layered resources to an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more information handling systems, data storage systems, and networking systems.

Application layers may be shared between multiple users. Any modifications to an application layer will be reflected to all the users who have mounted the modified application layer. Multiple users modifying an application layer may leave the application layer in an inconsistent state. An issue arises when installation of updates, patches, or new applications for an application of an application layer is required as any user modifications are lost or invalidated.

SUMMARY

In one embodiment, a method of preserving user changes in a layering environment includes registering a layer driver with an operating system, mounting a first layer, mounting a layering write cache, and mounting a layering write cache associated with the first layer. The layering driver receives one or more file operation requests directed to a layered resource and determines whether an instance of the layered resource is in the layering write cache. The file open operation is then redirected to the layering write cache.

In another embodiment, the first layer is mounted in a read-only mode and the layering write cache is mounted in a read-write mode.

In yet another embodiment, the method may further include creating the layering write cache.

In yet another embodiment, each create file request associated with at least one of the one or more file operation requests is directed to the layering write cache and an instance of the layered resource is created in the layering write cache.

In yet another embodiment, each file write request associated with at least one of the one or more file operation requests is redirected to the layering write cache. Likewise, another embodiment includes determining whether the file write request is directed to an instance of the layered resource located in the first layer and copying the instance of the layered resource to the layering write cache.

In one embodiment, one or more computer-readable non-transitory storage media embodies logic that is operable when executed to perform any of the method steps of any embodiment.

In one embodiment, an information handling system includes one or more processor and a memory coupled to the processors where the memory includes instructions executable by the processors and the processor are operable when executing the instructions to perform any of the method steps of any embodiment. In one embodiment, one or more processors execute the instructions to perform any of the method steps of any embodiment. In another embodiment, two or more processor execute the instructions to perform any of the method steps of any embodiment.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
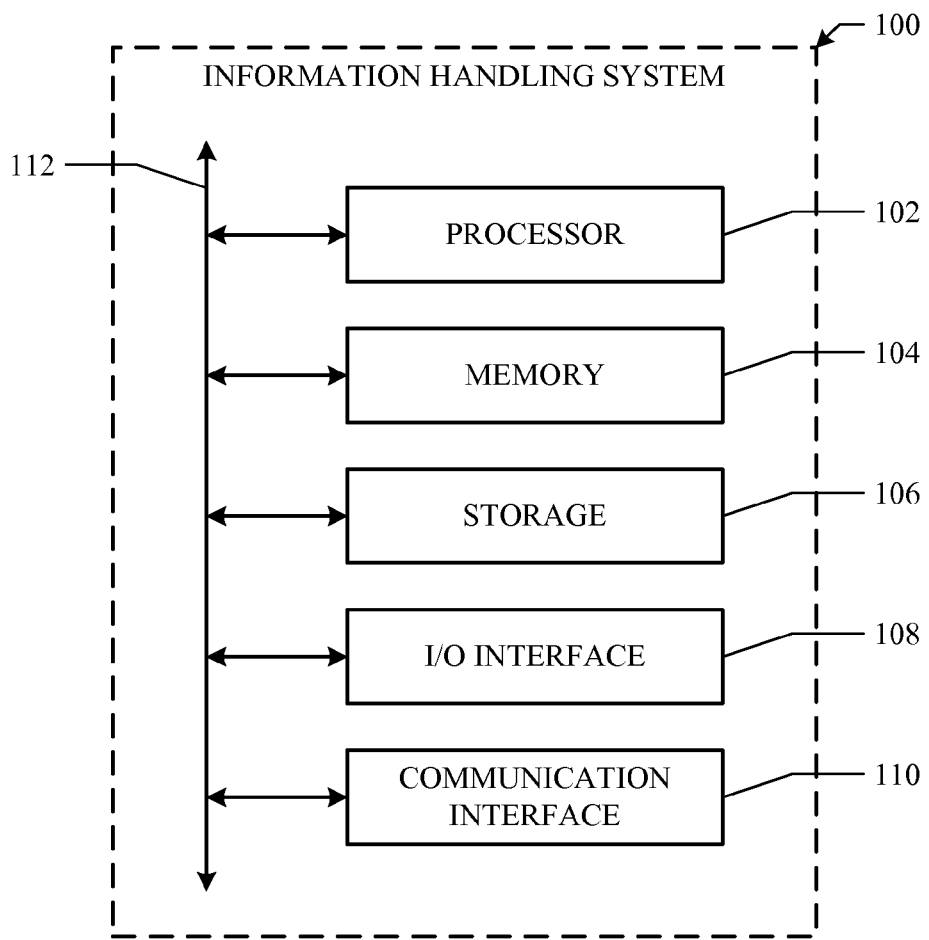
FIG. 1 is a block diagram of selected elements of an information handling system.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Previous systems implemented a write cache but when patches, updates or new applications were installed on an application layer, any modifications made by a user would be invalidated or lost as the client has no information about the write cache or disk-block based cache. This issue may be addressed by using a write cache based on the layering elements. That is, instead of storing modified disk blocks, modifications to an application layer are stored in the write cache that stores the changed files and registry entries. The disk-block level dependency between the original layer and the modified layer are removed. Any modified files and/or registry entries are saved in the write cache as opposed to only storing changes to a file or registry entry. For example, if an administrator updates an application layer, a user's changes are preserved in the write cache and can still be used by the user as any modified files and registry entries have been saved.

Layering may be considered a technique for presenting a merged view of two or more layers. A layer is a structured collection of elements that may include, but is not limited to, files, folders, registry keys and registry values. These elements may be referred to as layering elements or layered resources. Layers are stored on a storage medium, which may include a file system, such as NTFS, to manage on-disk storage. One example of a layering storage medium is a virtual disk or Dell vDisk, which may be local to the client or streamed from a server.

Storage media on a server may be streamed as a streamed layering storage, such as streamed virtual disk or Dell streaming vDisks, and delivered to client devices on demand over a network using a proprietary protocol. A client disk driver may present streamed layering storage, such as Dell streaming vDisks, to an operations system (OS) on a client device as additional storage. The client operating system (OS) sees the streamed layering storage as if it was locally attached to the client device itself. Using streaming layering storage technology, a single storage medium, for example a Dell vDisk, at the server can be made available to multiple devices simultaneously and be shared among multiple users. Throughout this disclosure, vDisk may be used interchangeably with streaming or streamed layering storage.

A layer may be an application layer if it contains layered resources from one or more applications. For example, an application layer could be, but is not limited to, a vDisk containing layered resources for a web browser application (for example, Firefox) or a productivity application (for example, Microsoft Word).

Application layers may be shared between multiple users. As a result, any modifications to a layer will be reflected to all users who have mounted the layer. Additionally, multiple users modifying a layer can leave the layer in an inconsistent state. Therefore, to maintain consistency of the mounted layer, modifying and updating the layer should be controlled by, for example, limiting modifying and updating tasks to an administrator. However, there is still a need to save user changes in a separate location other than the application layer.

One approach to addressing this problem is to use a vDisk write cache. A vDisk write cache is a disk-block based cache. Layers are backed by vDisks on the server. Accordingly, a vDisk write cache is a collection of modified disk blocks. Any changes made to a layer are captured by a server-side vDisk management service, which stores the chanes in a vDisk write cache. The vDisk write cache is stored as a separate file on the server. When a disk block read request is received, the vDisk management service on the server will first perform a lookup on the cache. If the disk block is not found in the cache, the disk block will be read from the vDisk. The modified disk blocks may include file contents or file system metadata. vDisk write cache blocks are directly mapped to disk blocks of the corresponding vDisk and therefore work in conjunction with the vDisk. As a result, any modifications to the vDisk invalidates the corresponding vDisk write cache. This becomes a problem when patching or updating applications on an application layer or adding a new application to an already existing application layer since applying a change to the application layer invalidates all user changes in the vDisk write cache and renders the vDisk write cache unusable.

User changes may be preserved by using a layering write cache. Instead of storing modified disk blocks, user changes are stored in the layering write cache. This removes the disk-block level dependency between the original layer and any changed contents. The modified files and registry entries are saved as complete files, instead of just storing changes. As a result, if an update is applied to an application layer, any user changes will still be preserved and can still be used.

One example of user changes that may be preserved across an update of an application layer is preserving bookmarks across an update of a browser. For example, a user may mount an application layer containing an application, such as a web browser, for example, the Firefox web browser, and create several application specific modifications, such as bookmarks. If a newer version of the application is released and an administrator decides to update the application layer with the newer version, the application specific modifications (for example, the bookmarks) would be lost under the previously described vDisk write cache approach. However, the layering write cache approach would preserve all user changes, including the user-created application specific modifications (for example, bookmarks), for later use.

To implement a layering write cache, one or more new layers are created for each user and are designated as the user's layering write cache. When a user logs into a system, all layers are mounted as read only except for the layering write cache, which is mounted in read/write mode. If a file is opened, a layering driver first checks the layering write cache for the file. If it is not found, the layering driver looks for the file in other mounted layers. The search of the other mounted layers may proceed based on a priority assigned to the other layers. When a user attempts to modify a file, the file is first copied to the layering write cache and any modifications are applied to the copy in the layering write cache, keeping the original file in the read-only layer unchanged.

When a user creates a new file, the file is created only in the layering write cache to keep the original layer unchanged. Registry operations are handled in a similar way in that any new registry entries are created only in the layering write cache. Because registry values are changed by setting the registry entry to have a new value, any new registry values are also created in the layering cache.

The disk and registry hierarchy of the layering write cache reflects that of the original disk. For example, if a request is made to modify file "\Users\User1\Desktop\Example.txt" on an application layer, a copy of the file is created at the same path in the layering write cache. Similarly, if a request is made to create a new file, the file will be created in the same folder structure as the application layer. Such a process facilitates easier look up and enumeration operations.

When a folder or registry enumeration operation is received, the layering write cache is enumerated as if it were an independent layer. Accordingly, when an enumeration request is received, files, folders, registry keys, and values from the layering write cache are presented in a unified view to a requesting user or application.

A user may have multiple layering write caches. If a user has multiple layering write caches, changes to different application layers may be directed to different layering write caches. For example, if a user mounts three application layers A, B, and C, the user could have two layering write caches X and Y and direct changes to application layers A and B to layering write cache X and directed changes to application layer C to layering write cache Y. The present invention contemplates any combination of application layers and write caches.

Figure 2:
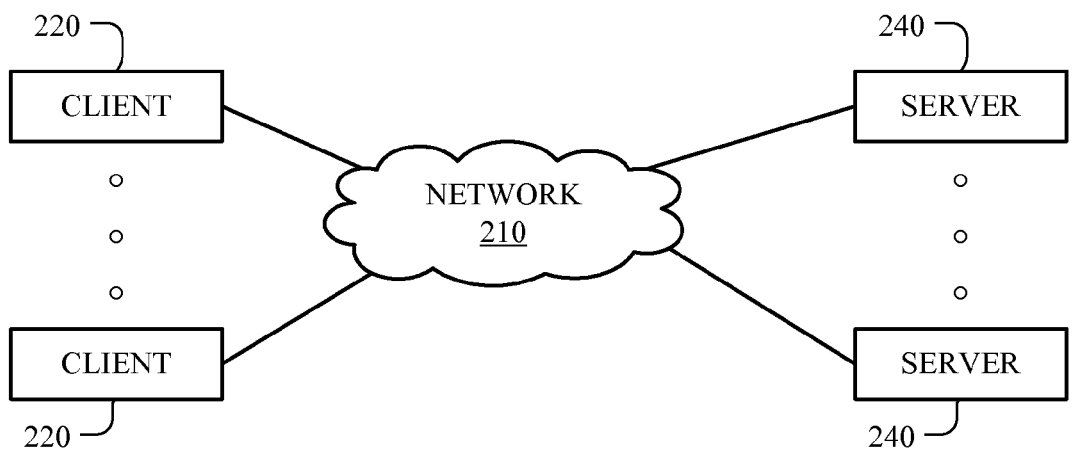
FIG. 2 is an example of a network environment.
Figure 3:
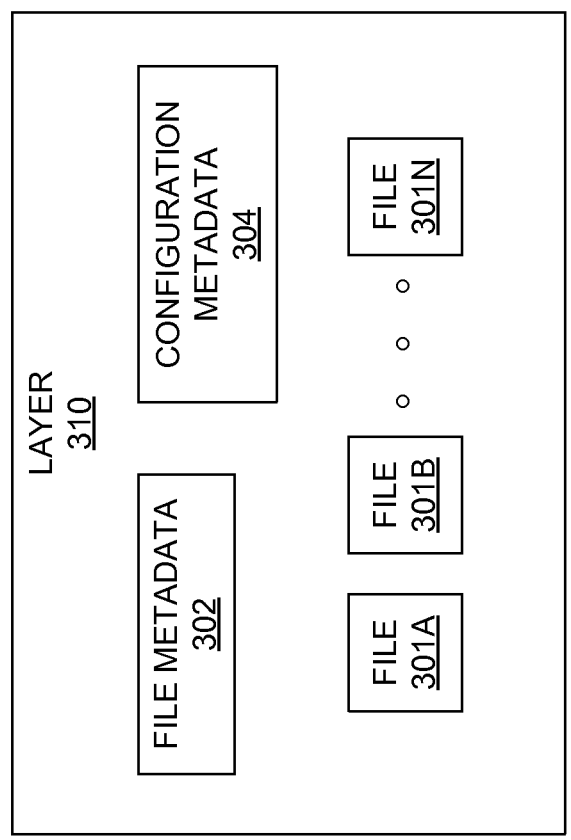
FIG. 3 is an example of a layer.

Particular embodiments are best understood by reference to FIGS. 1-3, wherein like numbers are used to indicate like and corresponding parts.

FIG. 1 illustrates an example information handling system 100. In particular embodiments, one or more information handling systems 100 perform one or more steps of one or more methods described or illustrated herein. In particular embodiments, one or more information handling systems 100 provide functionality described or illustrated herein. In particular embodiments, software running on one or more information handling systems 100 performs one or more steps of one or more methods described or illustrated herein or provides functionality described or illustrated herein. Particular embodiments include one or more portions of one or more information handling systems 100. Herein, reference to an information handling system may encompass a computing device, and vice versa, where appropriate. Moreover, reference to an information handling system may encompass one or more information handling systems, where appropriate.

This disclosure contemplates any suitable number of information handling systems 100. This disclosure contemplates information handling system 100 taking any suitable physical form. As example and not by way of limitation, information handling system 100 may be an embedded information handling system, a system-on-chip (SOC), a single-board information handling system (SBC) (such as, for example, a computer-on-module (COM) or system-on-module (SOM)), a desktop information handling system, a laptop or notebook information handling system, an interactive kiosk, a mainframe, a mesh of information handling systems, a mobile telephone, a personal digital assistant (PDA), a server, a tablet information handling system, or a combination of two or more of these. Where appropriate, information handling system 100 may include one or more information handling systems 100; be unitary or distributed; span multiple locations; span multiple machines; span multiple data centers; or reside in a cloud, which may include one or more cloud components in one or more networks. Where appropriate, one or more information handling systems 100 may perform without substantial spatial or temporal limitation one or more steps of one or more methods described or illustrated herein. As an example and not by way of limitation, one or more information handling systems 100 may perform in real time or in batch mode one or more steps of one or more methods described or illustrated herein. One or more information handling systems 100 may perform at different times or at different locations one or more steps of one or more methods described or illustrated herein, where appropriate.

In particular embodiments, information handling system 100 includes a processor 102, memory 104, storage 106, an input/output (I/O) interface 108, a communication interface 110, and a bus 112. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 102 includes hardware for executing instructions, such as those making up a computer program. As an example and not by way of limitation, to execute instructions, processor 102 may retrieve (or fetch) the instructions from an internal register, an internal cache, memory 104, or storage 106; decode and execute them; and then write one or more results to an internal register, an internal cache, memory 104, or storage 106. In particular embodiments, processor 102 may include one or more internal caches for data, instructions, or addresses. This disclosure contemplates processor 102 including any suitable number of any suitable internal caches, where appropriate. As an example and not by way of limitation, processor 102 may include one or more instruction caches, one or more data caches, and one or more translation lookaside buffers (TLBs). Instructions in the instruction caches may be copies of instructions in memory 104 or storage 106, and the instruction caches may speed up retrieval of those instructions by processor 102. Data in the data caches may be copies of data in memory 104 or storage 106 for instructions executing at processor 102 to operate on; the results of previous instructions executed at processor 102 for access by subsequent instructions executing at processor 102 or for writing to memory 104 or storage 106; or other suitable data. The data caches may speed up read or write operations by processor 102. The TLBs may speed up virtual-address translation for processor 102. In particular embodiments, processor 102 may include one or more internal registers for data, instructions, or addresses. This disclosure contemplates processor 102 including any suitable number of any suitable internal registers, where appropriate. Where appropriate, processor 102 may include one or more arithmetic logic units (ALUs); be a multi-core processor; or include one or more processors 102. Although this disclosure describes and illustrates a particular processor, this disclosure contemplates any suitable processor.

In particular embodiments, memory 104 includes main memory for storing instructions for processor 102 to execute or data for processor 102 to operate on. As an example and not by way of limitation, information handling system 100 may load instructions from storage 106 or another source (such as, for example, another information handling system 100) to memory 104. Processor 102 may then load the instructions from memory 104 to an internal register or internal cache. To execute the instructions, processor 102 may retrieve the instructions from the internal register or internal cache and decode them. During or after execution of the instructions, processor 102 may write one or more results (which may be intermediate or final results) to the internal register or internal cache. Processor 102 may then write one or more of those results to memory 104. In particular embodiments, processor 102 executes only instructions in one or more internal registers or internal caches or in memory 104 (as opposed to storage 106 or elsewhere) and operates only on data in one or more internal registers or internal caches or in memory 104 (as opposed to storage 106 or elsewhere). One or more memory buses (which may each include an address bus and a data bus) may couple processor 102 to memory 104. Bus 112 may include one or more memory buses, as described below. In particular embodiments, one or more memory management units (MMUs) reside between processor 102 and memory 104 and facilitate accesses to memory 104 requested by processor 102. In particular embodiments, memory 104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 104 may include one or more memories 104, where appropriate. Although this disclosure describes and illustrates particular memory, this disclosure contemplates any suitable memory.

In particular embodiments, storage 106 includes mass storage for data or instructions. As an example and not by way of limitation, storage 106 may include a hard disk drive (HDD), a floppy disk drive, flash memory, an optical disc, a magneto-optical disc, magnetic tape, or a USB drive or a combination of two or more of these. Storage 106 may include removable or non-removable (or fixed) media, where appropriate. Storage 106 may be internal or external to information handling system 100, where appropriate. In particular embodiments, storage 106 is non-volatile, solid-state memory. In particular embodiments, storage 106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 106 taking any suitable physical form. Storage 106 may include one or more storage control units facilitating communication between processor 102 and storage 106, where appropriate. Where appropriate, storage 106 may include one or more storages 106. Although this disclosure describes and illustrates particular storage, this disclosure contemplates any suitable storage.

In particular embodiments, I/O interface 108 includes hardware, software, or both, providing one or more interfaces for communication between information handling system 100 and one or more I/O devices. Information handling system 100 may include one or more of these I/O devices, where appropriate. One or more of these I/O devices may enable communication between a person and information handling system 100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 108 for them. Where appropriate, I/O interface 108 may include one or more device or software drivers enabling processor 102 to drive one or more of these I/O devices. I/O interface 108 may include one or more I/O interfaces 108, where appropriate. Although this disclosure describes and illustrates a particular I/O interface, this disclosure contemplates any suitable I/O interface.

In particular embodiments, communication interface 110 includes hardware, software, or both providing one or more interfaces for communication (such as, for example, packet-based communication) between information handling system 100 and one or more other information handling systems 100 or one or more networks. As an example and not by way of limitation, communication interface 110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 110 for it. As an example and not by way of limitation, information handling system 100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Information handling system 100 may include any suitable communication interface 110 for any of these networks, where appropriate. Communication interface 110 may include one or more communication interfaces 110, where appropriate. Although this disclosure describes and illustrates a particular communication interface, this disclosure contemplates any suitable communication interface.

In particular embodiments, bus 112 includes hardware, software, or both coupling components of information handling system 100 to each other. As an example and not by way of limitation, bus 112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 112 may include one or more buses 112, where appropriate. Although this disclosure describes and illustrates a particular bus, this disclosure contemplates any suitable bus or interconnect.

FIG. 2 illustrates an example configuration of networked information handling systems (e.g. client devices and servers). In particular embodiments, one or more client devices 220 and one or more servers 240 are connected via network 210. Network 210 may be a public network or a private (e.g. corporate) network. Additionally, network 210 may, for example, be a Local Area Network (LAN), a Wide Area Network (WAN), a wireless network, the Internet, an intranet or any other suitable type of network. In particular embodiments, network 210 may include one or more routers for routing data between client devices 220 and/or servers 240. A device (e.g., a client device 220 or a server 240) on network 210 may be addressed by a corresponding network address including, for example, an Internet protocol (IP) address, an Internet name, a Windows Internet name service (WINS) name, a domain name or other system name. In particular embodiments, network 210 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client devices 220 may communicate with one or more servers 240 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Client device 220 may be a desktop computer, a laptop computer, a tablet computer, a handheld device, a mobile phone, a kiosk, a vending machine, a billboard, or any suitable information handling system. In particular embodiments, a client device 220 is an embedded computer and may have flash memory (e.g. a solid state drive) instead of a hard disk drive. In particular embodiments, a client device 220 is a thin client having limited processing capabilities and limited storage, and such a thin client may require minimal management and updates. A client device 220 may communicate with a server 240 via any one or more protocols such as Hypertext Transfer Protocol (HTTP), Hypertext Transfer Protocol Secure (HTTPS), File Transfer Protocol (FTP), Common Internet File System (CIFS), Independent Computing Architecture (ICA) protocol (developed by Citrix Systems, Inc.), Remote Desktop Protocol (RDP) (developed by Microsoft Corporation), or any suitable protocol or combination of protocols.

A server 240 may include one or more of: a computing device, a desktop computer, a laptop computer, a database, a corporate server, a repository server, a configuration application server, a domain name system (DNS) server, a dynamic host configuration protocol (DHCP) server, a virtual machine (e.g., VMware® Virtual Machine), a desktop session (e.g., Microsoft Terminal Server), a published application (e.g., Microsoft Terminal Server), or any suitable information handling system. As an example, a private (e.g. corporate) network may include a device manager server and a repository server each configured to communicate with multiple client devices 220 across one or more domains, sites, or subnets of network 210. In particular embodiments, a server 240 may include one or more servers, or functions of one or more servers. A client device 220 may access software resources provided by a server 240 such as, for example, operating systems, add-ons, content, or any other suitable data, applications, or images. In particular embodiments, a client 220 may access resources provided by a server 240 only after providing suitable authentication information. Alternatively, a server 240 may provide software or other resources automatically to one or more client devices 220.

A system and method for providing layered resources to an information handling system is disclosed herein. A layer is a container or collection of data or resources. The data or resources may comprise executable code, such as an operating system or user application. The data or resources may comprise configuration data for an information handling system, such as registry settings in a Microsoft Windows environment, or other data structures used to store configuration settings, such as text files, XML files, and the like. The data or resources may comprise files in any format, including but not limited to, text files, HTML files, or proprietary files such as Microsoft Word ".DOC" or ".DOCX" files or Microsoft Excel ".XLS" spreadsheets.

FIG. 3 illustrates a particular embodiment of a layer 310. In this embodiment, layer 310 contains one more or more files or resources 301A-301N associated with an application, such as Microsoft Word, Microsoft Excel, Microsoft Outlook, Adobe Acrobat, or the FireFox web browser. The files or resources 301A-N may comprise executable code, non-executable data (e.g., images, help files, templates, et cetera), or a combination of executable and non-executable data. The layer may also contain configuration information necessary for the application to run on the information handling system. For example, for an application executable by a Microsoft Windows operating system, the application may require one or more registry settings. Therefore, the layer may store the registry keys and values associated with the application. The registry keys and values may be stored as metadata. In particular embodiments, the registry keys and values may be stored in a registry hive in the layer.

In particular embodiments, the layer comprises an operating system image, and files 301A-301N comprise the executable and non-executable files associated with a particular operating system. For example, the files may comprise the bootloader, the kernel, hardware drivers, software drivers, and other files associated with the operating system. The layer may also contain configuration information necessary for the operating system, such as environment settings and network configuration settings.

In particular embodiments, a layer may contain data or resources for more than one application or operating system. For example, an organization may create an "Accounting Department" layer that contains all the files, resources, or configuration settings necessary for applications deployed to users in the organization's accounting department. Continuing with this example, the accounting department layer may contain an image of Microsoft Excel, Microsoft Word, and other applications typically deployed to users in the accounting department, all in a single layer. In particular embodiments, the layer may also contain files, resources, or configuration settings for one or more operating systems.

A layer may also contain metadata that describes the contents of the layer. Any suitable data structure, such as an XML file, a hash table, a tree data structure, an array, a linked list, or a Microsoft registry hive, may be used to store the metadata. The layer may contain one or more data structures to store the metadata. Referring to the particular embodiment depicted in FIG. 3, layer 310 comprises file metadata 302 and configuration metadata 304. File metadata

302 may comprise one or more data structures identifying the files 301A-301N stored in layer 310, identify one or more logical blocks associated with the files, or identify one or more logical-to-physical mappings of the files. Configuration metadata 304 may store configuration settings associated with the layer, or identify where configuration settings associated with the layer are stored. In particular embodiments, registry key and value pairs are stored in configuration metadata 404. In particular embodiments, the configuration metadata is stored in a Microsoft registry hive.

No particular storage medium is required for storing a layer and the associated data or resources. By way of example and not by way of limitation, layer 310 may be stored on a hard disk drive (e.g., a partition the hard disk drive), a virtual disk, a RAM disk, a USB storage device, a Flash storage device, a DVD (digital versatile disc), or any other suitable storage medium. The storage medium may be local to the information handling system. In particular embodiments, the storage medium may be remote from the information handling system. For example, the storage medium may comprise a network file share (e.g., an Network File System share, an NTFS/SMB file share), a block-based network share (e.g., storage area network using Fibre-Channel or iSCSI), or a cloud storage service. In a particular embodiment, a layer may be stored on a streaming virtual disk (vDisk). By way of example and not by way of limitation, an implementation of a streaming vDisk is available from Dell Inc. In particular embodiments, a layer may comprise a folder or directory on a storage medium where the data and resources associated with the layer are stored. For example, a layer may comprise a partition of a streaming Virtual Disk (vDisk) where all of the data and resources associated with the layer are stored.

In particular embodiments, a layer may be stored remotely from the information handling system. If the information handling system maintains connectivity to the remote storage medium, the layer may remain remotely stored from the information handling system. In particular embodiments, the layer (or portions of the layer) may be cached or staged to a storage medium local to the information handling system. For example, caching or staging a layer locally may permit increased performance during runtime or permit offline usage of the layer. The layering system and method disclosed herein does not require that the one or more layers provided to the information handling system be stored on a single type of storage medium or at a single location. By way of example and not by way of limitation, an information handling system may be provided with access to a first layer that is stored on a local storage medium, and a second layer that is stored on a remote storage medium.

In particular embodiments, the layering system comprises a layering client, a layering file-system filter driver (LFFD), and a layering registry filter driver (LRFD) provided for the information handling system. The terms layering file-system filter driver, layering file system filter driver, layering file-filter driver and layering file filter driver are used interchangeably.

In particular embodiments, the layering client is responsible for managing the mounting of layers. The layering client may determine which layers are to be mounted based upon the identity of the user, a role associated with the user, an identifier of the information handling system, a geographic location, or any other criteria that may be relevant to provisioning software to an information handling system. Layers may be mounted at boot time (such as when a layer is used to provide the operating system), during a log-on process, or dynamically (such as when a user clicks an icon associated with a layer resource). In particular embodiments, a layer is mounted as a file system and is assigned an available drive letter. The drive may be hidden from the user to prevent a user from directly accessing or modifying the contents of the layer. When more than one layer is mounted, the layering client may assign a priority or ordering to the mounted layers. The assigned priority or ordering may be used to resolve conflicts between layers, such as when more than one mounted layer contains a similarly named resource.

In particular embodiments, the criteria or rules to mount a layer are decoupled from the client device where layers are actually mounted. For example, the layering client may send an identifier associated with the current user and an identifier associated with the client device to a management server. The management server is responsible for applying the criteria or rules to determine which layers the client device should mount. The rules or criteria may comprise any combination of user name, a group associated with the user, time of the day, type of device (laptop/PC/Tablet), or any other suitable criteria.

In particular embodiments, the layering client may configure the other layering drivers provided for the information handling system. For example, the layering client may notify the layering drivers when a layer has been mounted or dismounted. The layering client may also be used to alter the operating state of the layering drivers. For example, the layering drivers may have multiple operating states, such as a "normal" or "runtime" state, and an "install" or "create layer" state.

In particular embodiments, a method of creating a layer is disclosed herein. The layering client may receive a notification to create a layer. The notification may be received from a user interface provided on the information handling system or may be received from a remote information handling system. The layering client may determine a target storage location on a suitable storage medium from the notification, or by prompting a selection by a user of the information handling system. The layering client may re-format the target storage location if appropriate. The layering client may create a file metadata, a configuration metadata, or both on the target storage location. If any other layers are mounted, the layering client may dismount the other layers. The layering client mounts the target storage location as a layer. The layering configures the LFFD and the LRFD, if an LRFD is present, to operate in an "install" or "create layer" state. While in the "install" state, a user may install applications using standard application installer technology, and the installed applications will be created on the newly created layer. Once all applications have been installed, the layering client may receive a notification that installation is complete and that the layering system should be put back into a "normal" or "runtime" state. At this point, the layering client may dismount the newly created layer. The layering client configures the LFFD and the LRFD, if an LRFD is present, to operate in a "normal" or "runtime" state.

In particular embodiments, the layering file system filter driver (LFFD) may be loaded onto a file system stack of the information handling system's operating system. The LFFD may register with the OS to receive notifications for all file operations (e.g. create, open, close, read, write, rename, delete, directory enumeration, etc.). The LFFD is operable to allow a file operation to pass-through to the file system, or the LFFD may modify a file operation. By way of example and not by way of limitation, the LFFD may modify a file operation by blocking the operation, replicating the operation, redirecting the operation, or performing one of the operations described herein.

In the normal or runtime state, the LFFD examines each file operation and determines whether the file operation must be redirected or modified to make use of a file contained in a mounted layer. This determination may be made by performing a path lookup against metadata describing the files contained in the mounted layers. For example, the LFFD may load the file metadata for a layer when it is mounted, and then use the file metadata to perform a path lookup.

In particular embodiments, a method for handling a file open operation by the LFFD is disclosed. The LFFD receives a notification of a file open operation, and identifies the target file from the notification. Next, the LFFD may perform a path lookup against the file metadata of a first mounted layer. If there is no match, the LFFD may move to the next mounted layer and perform a path lookup against the file metadata of the next mounted layer recursively until there are no other mounted layers or a match is found. If there are no other mounted layers, the LFFD will allow the file open operation to be handled by the file system. When a path lookup results in a match, the LFFD looks for a file described by file metadata. If the file is found in the mounted layer, the LFFD modifies the file open operation by redirecting the target of the file open operation to point to the file found in the mounted layer. If no file is found in the mounted layer, the LFFD proceeds to perform a path lookup against the next mounted layer and so on. The order in which the LFFD checks the file metadata of each mounted layer may be determined by a priority or ordering assigned to the layers.

For example, assume a layer is mounted as drive E:, and the layer contains a file "Foo.txt" that is associated with the path "\Program Files\App\". If the LFFD receives a notification for a file open operation that specifies a target of "C:\Program Files\App\Foo.txt", the LFFD will perform a path lookup against the file metadata for all mounted layers. In this example, the LFFD will match the path "\Program Files\App\", and determine that the file operation may be associated with the layer mounted at E:. Next, the LFFD will check to see if there is a file "Foo.txt" in the mounted layer. In this example, the LFFD will locate the file "Foo.txt". Having made the determination that the file operation targets a file associated with a mounted layer, the LFFD will redirect the file open operation such that the file located at "E:\Program Files\App\Foo.txt" is opened instead of a file located at the same path on the C: drive, even if such a file existed. If the LFFD matches the path to a mounted layer, but the LFFD does not locate the described file within the layer, then the LFFD will allow the file operation to pass to the file system of the operating system for normal handling.

In particular embodiments, a method for handling a file directory enumeration operation by the LFFD is disclosed. The LFFD receives a notification of a file directory enumeration operation, and identifies the target file directory. For each mounted layer, the LFFD creates a file directory enumeration operation that targets the mounted layer. The results returned by the file directory enumeration operation for each mounted layer are merged together with the result of a file directory enumeration operation that is allowed to pass-through to the file system. Before returning the results, the LFFD will filter out duplicate files such that only the file associated with the highest priority layer is returned.

For example, assume there is a first layer mounted at E:, a second layer mounted at F:, and a third layer mounted at G:. When the LFFD receives a notification of a file directory enumeration operation targeting "C:\Program Files\App\", the LFFD will send file directory enumeration operations targeting "E:\Program Files\App\", "F:\Program Files\App\", and "G:\Program Files\App\". The results of these operations are merged with the result of a file directory enumeration operation that is passed-through to the file system targeting "C:\Program Files\App\". To the user or an application, the results appear to only come from a single directory while the results were generated by combining the files in four different file directories. If there are two or more files with the same name across the four different file directories, the LFFD will filter out the duplicate file names according to the priority or ordering assigned to the layers.

In particular embodiments, a method for handling a file directory enumeration operation by the LFFD using a file directory query hook is disclosed. The LFFD makes use of a directory query hook provided by file system instead of creating separate file directory enumeration operations that target each mounted layer. First, the LFFD receives a file directory enumeration operation. The LFFD identifies the highest priority layer, redirects the file directory enumeration operation to the highest priority layer, sets a flag that indicates that more results will be available, and records in metadata the next layer to be queried. When the query is returned from the highest priority layer, the initiating process receives the results, and the set flag triggers the initiating process to resubmit the file directory enumeration operation. The LFFD recognizes that the file directory enumeration operation is a continuation of a prior request, checks the metadata to identify the next layer to be queried, redirects the operation to the next layer, sets the flag indicating that more results are available, and updates the metadata to identify the next layer to be queried. The process continues until there are no more layers to check, in which case, the operation is passed-through to the file system. During this process, the LFFD tracks the results returned by each operation, and filters duplicate files from subsequent queries to prevent multiple files with the same name appearing in the directory view.

In particular embodiments, it may be unnecessary for the LFFD to modify the behavior of other file operations if the remaining types of file operations make use of a file handle. For example, if a file open operation must be performed before a read file operation, a write file operation, or a close file operation, no modification to these file operations are necessary so long as the file operations make use of a file handle returned from a file open operation. If the target file is associated with a file in a layer, then the file handle returned by the file open operation will have been redirected to the layer resource by the LFFD. Continuing the previous example, when a file open operation targeting "C:\Program Files\App\Foo.txt" is handled by the LFFD, the LFFD returns a file handle that points to the "Foo.txt" file at its location in the layer mounted at the E: drive. Any subsequent file operations using the file handle will make use of the file located in the layer automatically.

In particular embodiments, the LFFD may perform the path lookups described herein using cached metadata. In a particular embodiment, the metadata cache is created by loading metadata stored in a layer when the layer is first mounted. The cached metadata can be stored as a hash table where paths are used as the hash key or as in-memory search tree.

In another particular embodiment, the metadata cache is implemented using Microsoft Windows registry hives. In this embodiment, the file metadata for each layer is stored in a registry hive in each layer. When the layer is mounted, the LFFD locates the registry hive containing the file metadata for the layer, and loads the registry hive into the registry. The LFFD performs path lookups by querying each layer's registry hive loaded into the registry. When the layer is dismounted, the LFFD unloads the registry hive from the registry.

In particular embodiments, a method for handling a file create operation by the LFFD operating in an "install" or "create layer" mode is disclosed. The LFFD receives a notification of a file create operation, and determines the target path. The LFFD redirects the file create operation to a destination location on the storage medium for the mounted layer that is in an "install" state. The LFFD may update the file metadata associated with the mounted layer to include information concerning the target path and the destination location to facilitate a path lookup. The LFFD may return a file handle pointing to the destination location to the calling process.

For example, assume that the layer in an "install" state is mounted as E:. While the layering system is in install mode, the user runs an installer package for an application. The installer package attempts to create a file at the target path "C:\Program Files\App\Foo.txt". The LFFD receives a notification of the file create operation, and redirects the file create operation to the destination path "E:\Program Files\App\Foo.txt". The LFFD may update the file metadata to associate the target path "\Program Files\App\Foo.txt" with the destination path within the layer "\Program Files\App\Foo.txt". At the completion of the file create operation, the installer package receives a file handle that points to the file stored at "E:\Program Files\App\Foo.txt".

In particular embodiments, a method for handling a file modify operation by the LFFD operating in an "install" or "create layer" mode is disclosed. The LFFD receives a notification of a file modification operation, and determines the target path. The LFFD redirects the file create operation to a destination location on the storage medium for the mounted layer that is in an "install" state. If the file does not exist on the storage medium for the mounted layer, the file may be copied from the target path to the mounted layer, and then apply the modification. The LFFD may update the file metadata associated with the mounted layer to include information concerning the target path and the destination location to facilitate a path lookup. The LFFD may return a file handle pointing to the destination location to the calling process.

If the information handling system is running an operating system that uses a registry for storing configuration settings (for example, a Microsoft Windows operating system), then a layering registry filter driver (LRFD) may be provided. The LRFD may register with the OS to receive a notification for all registry operations (e.g. create key, get key value, delete key, delete key value, enumerate keys, etc.). The layering registry filter driver can allow a registry operation to pass-through to the OS's registry, or block, replicate or redirect the registry operation to target configuration metadata in a mounted layer. In the normal or runtime state, the LRFD examines each registry operation and determines whether the registry operation must be redirected or modified to make use of a registry key or value associated with a mounted layer. This determination may be made by performing a lookup against the configuration metadata stored in the mounted layers.

In particular embodiments, a method for handling a registry modification or retrieval operation by the LRFD is disclosed. The LRFD receives a notification of a registry modification or retrieval operation (e.g., get registry key value or set registry key value), and identifies the target key from the notification. Next, the LRFD queries the configuration metadata for each mounted layer in the order of priority assigned to the mounted layers. When the first match is found, the LRFD redirects the registry operation to the configuration metadata in the mounted layer associated with the first match, and returns the result to the calling process. If there is no match, the LRFD allows the registry operation to pass-through to the registry for normal handling.

For example, assume there is a first layer mounted at E:, a second layer mounted at F:, and a third layer mounted at G:. Also assume that the second layer's configuration metadata contains a key and value associated with the registry path "HKEY_LOCAL_MACHINE\SOFTWAREWendor\Key1", and assume that the registry also contains a key and value at the same path. When the LRFD receives a notification of a registry get key value operation targeting "HKEY_LOCAL_MACHINE\SOFTWAREWendor\Key1", the LRFD will query configuration metadata for the first mounted layer and not find a match, the LRFD will query configuration metadata for the second mounted layer and find a match. At this point, the LRFD will redirect the registry operation to the configuration metadata of the second layer, and the calling process will receive the value stored in the configuration metadata of the second layer. Continuing with this example, assume that the registry path does not exist in the second mounted layer. With this modification, the LRFD would query the configuration data of all three mounted layers, and not find a match. At this point, the LRFD would allow the registry operation to be handled by the registry.

In particular embodiments, a method for handling a registry enumeration operation by the LRFD is disclosed. The LRFD receives a notification of a registry enumeration operation, and identifies the target registry path from the notification. Next, the LRFD queries the configuration metadata for each mounted layer in the order of priority assigned to the mounted layers. For each queried configuration metadata, the LRFD gathers and merges all of the registry keys and values associated with the target path. If there are registry keys that are the same in more than one configuration metadata or the registry, the LRFD filters out the registry keys and values associated with the lower priority layers and the registry. The combined results are returned to the calling process.

In particular embodiments, a registry operation that requires the creation of new keys or trees while the LRFD is in a "normal" or "runtime" state is allowed to pass-through to the registry. Although this disclosure describes particular embodiments of methods for handling registry operations by the LRFD, the disclosure contemplates other embodiments of methods for handling registry operations by the LRFD.

In particular embodiments, a method for handling a registry key create operation by the LRFD operating in an "install" or "create layer" state is disclosed. The LRFD receives a notification of a registry create operation (e.g., create registry key), and identifies the target key from the notification. Next, the LRFD redirects the registry operation to the configuration metadata in the mounted layer that is in an "install" state.

In particular embodiments, the configuration metadata is registry hive stored in the layer. In such an embodiment, redirecting the registry operation comprises redirecting the registry operation from the registry to the registry hive stored in the layer.

For example, assume that the layering system is in an "install" or "create layer" state. While an application installer executes, the installer package attempts to create a new key at target registry path "HKEY_LOCAL_MACHINE\SOFTWARE\Vendor\Key1" and value "Value1". The LRFD receives a notification of the registry create key operation, and redirects the registry create key operation to the destination path "HKEY_LOCAL_MACHINE \SOFTWARE\Vendor\Key" in the registry hive stored in the layer that is mounted in the "install" state. The installer application receives a notification that the registry operation was successful, even though the new key and value were stored in a registry hive stored in the mounted layer as opposed to the registry.

In particular embodiments, a method for handling a registry key modification operation by the LRFD operating in an "install" or "create layer" state is disclosed. The LRFD receives a notification of a registry key or value modification operation (e.g., set key value), and identifies the target key from the notification. Next, the LRFD redirects the registry modification operation to the configuration metadata in the mounted layer that is in an "install" state. If the target key or entry does not already exist in the configuration metadata (e.g. the registry key being modified was previously created in the registry), the target key will be created in the configuration metadata and the modification applied. The calling process or application receives a notification that the registry operation was successful, even though the modification was not applied to the registry.

For example, assume that there is a pre-existing registry key in the registry at the registry path "HKEY_LOCAL_MACHINE \SOFTWARE\Vendor\Key1" that has a value "Value1". After the layering system switches to an "install" or "create layer" state, an application attempts to change the data of the value associated with a key. The LRFD will receive a notification of the registry modification operation, and will redirect the change to the configuration metadata stored in the layer mounted in the "install" or "create layer" state. If the key does not already exist in the layer, the key is created and the data associated with the value is set to "Value2". If the key already exists in the layer, the data associated with the value is changed to "Value2". The data of the value associated with the key in the registry is left unmodified as "Value1". The calling process is notified that the operation was successful even though the registry was not modified.

In particular embodiments, the operating system of the information handling system does not provide or use a registry for configuration data. In such embodiments, the layering system comprises a layering client and a layering file-system filter driver (LFFD) provided for the information handling system.

Layers may be subject to updates, including patches and other modifications. As a result of an update to a layer, user-specific changes made to layered resources of the layer may be lost. Accordingly, a system and method for preserving user changes across an update to a layer is disclosed herein.

At system boot, the LFFD may register with an operating system to receive notifications for when a new disk is mounted on the system. In particular embodiments, the LFFD examines user- and client device-specific settings or a user configuration to identify all layers associated with a particular user or client device. Assuming that the LFFD identifies at least a first layer to be mounted, a layering client mounts the first layer and a layering write cache associated with the first layer. If the layering write cache does not exist, the layering write cache is first created and then mounted. In particular embodiments, the first layer is mounted in a read-only mode while the layering write cache is mounted in a read/write mode.

In particular embodiments, the first layer and the layering write cache layer may be presented to users and applications in a merged view. In the merged view, layered resources (e.g., files, registry entries, registry values, etc.) of the first layer and the layering write cache may appear to the user or application as a single layer or file system regardless of whether the resource is located in the first layer or the layering write cache. For example, if the LFFD receives a file enumeration request (e.g., a directory query or "dir" command in the command shell), the LFFD may collect file information from all mounted layers and return a merged version of the file information. In one embodiment, one or more applications (in the case of an application layer) are made available to the user instantaneously or substantially instantaneously after the merged view of layering elements is presented. To the extent conflicts exist between layers, the LFFD may prioritize or treat as independent particular layers, such as the layering write cache, so that file information from a higher priority or independent layer is included in the merged information over file information from other layers. For example, a "dir" command on the command shell will look for a listing of all the files and directories inside a directory. This directory may exist on multiple layers. The LFFD will collect all the information from all the different layers and return this information to the requesting application.

In certain embodiments, only one instance of a layered resource is located in one of the first layer and the layering write cache. In such embodiments, the instance of the layered resource is the layered resource itself. Alternatively, multiple instances of the layered resource may exist in the first layer and the layering write cache. For example, a first instance of the layered resource may be located in the first layer while a second instance of the layered resource may be located in the layering write cache. To the extent an embodiment includes multiple instances of a layered resource, an instance of the layered resource may be a duplicate of another instance of the layered resource. For example, an instance of the layered resource located in the layering write cache may be a duplicate of an instance of the layered resource in the first layer. As a different example, the instance of the layered resource in the first layer may be a modified version of an instance of the layered resource in the first layer.

During operation, the LFFD intercepts file operations sent by a requestor and redirects the file operations based, at least in part, on, for example, the nature of the file operation and if a cached version of a layered resource exists in the layering write cache. Examples of file operations include, but are not limited to, opening a file, creating a file, writing to a file, and requesting an enumeration of a file system. The requestor of a file operation may be an application or other program running on an information handling system 100, such as a client 220, or may be a user of an information handling system 100.

A method of handling an open operation directed to a layered resource is disclosed. In certain embodiments, the open operation is received by the LFFD. The LFFD first determines if an instance of the layered resource is located in the layering write cache. If an instance of the layered resource is contained in the layering write cache, the open operation is directed to the instance of the layered resource in the layering write cache or a handle is returned from the layering write cache to the LFFD. If the LFFD determines that the layering write cache does not contain an instance of the layered resource, the LFFD determines if an instance of the layered resource is contained in the first layer. If so, the file open operation is directed to the instance of the layered resource located in the first layer. If not, an error may be returned to the LFFD.

A method of handling a create operation to create a layered resource in the first layer is disclosed. In a particular embodiment, the create operation is received by the LFFD and redirected by the LFFD to the layering write cache. An instance of the layered resource is subsequently created in the layering write cache. In particular embodiments, the first layer remains unchanged as a result of handling the create operation.

A method of handling a write operation to modify a layered resource is disclosed. In a particular embodiment, the write operation is received by the LFFD. The LFFD then determines if an instance of the layered resource is located in the layering write cache. If an instance of the layered resource is in the layering write cache, the LFFD directs the write operation to the instance of the layered resource. If the LFFD determines that an instance of the layered resource is not in the layering write cache, the LFFD determines if the layered resource is located in the first layer. If so, an instance of the layered resource is created in the layering write cache by copying the layered resource from the first layer to the layering write cache. The LFFD then directs the write operation to the instance of the layered resource contained in the layering write cache. The original instance of the layered resource is not modified.

A method of handling an enumeration operation to list all the files or directories within a mounted layer is disclosed. In a particular embodiment, the enumeration operation is received by the LFFD. The LFFD will merge the file and directory information, for example file and directory names, from all the mounted layers on the client 220. The directories and the files may exist on multiple layers, in which case the LFFD will collect all the information from all the different layers where the directory or files exist and return the merged information to the enumeration operation requestor.

Figure 4:
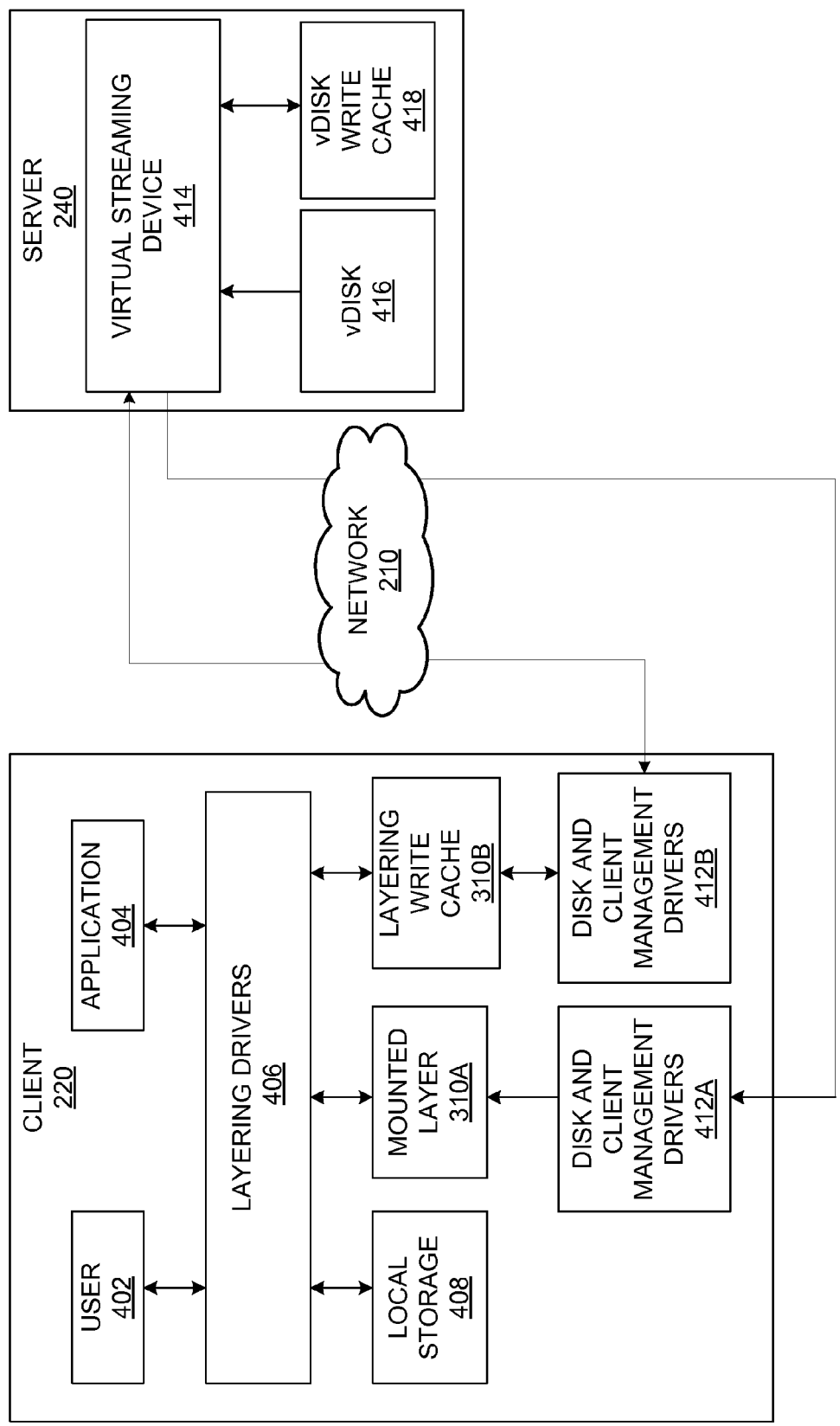
FIG. 4 is an example of a network environment having a layering write cache.

An example of a network environment having a layering write cache is depicted in FIG. 4. The network environment of FIG. 4 includes a client 220 and a server 240 connected via a network 210. Client 220 includes one or more layering drivers 406 that receive file operation requests from a user 402 or an application 404 and redirect the file operation requests to one of local storage 408, a mounted layer 310A, or a layering write cache 310B associated with mounted layer 310A. Layering drivers 406 may include, for example, a layering file-filter driver ("LFFD"). Disk and client management drivers 412A and 412B may facilitate communication between mounted layer 310A and layering write cache 310B and a virtual streaming device 414 of the server 240. Virtual streaming device 414 may be backed by a vDisk 416 and may cache write operations to the vDisk in a write cache 418.

During operation, layering drivers 406 receive one or more file operation requests from at least one of user 402 and application 404. Layering drivers 406 then determine whether to redirect each file operation to local storage 408, mounted layer 310A, or layering write cache 310B. For example, the layering drivers 406 may redirect a file create request for creating a layered resource in mounted layer 310A to the layering write cache 310B such that an instance of the layered resource is created in layering write cache 310B. As another example, a file read request directed to a layered resource in mounted layer 310A may be redirected to mounted layer 310A if layering drivers 406 determine that an instance of the layered resource does not exist in layering write cache 310B.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method of preserving user changes in a layering environment comprising:

registering a layering driver with an operating system, wherein the layering driver includes a layering file-filter driver;

mounting a first application layer, wherein the first application layer comprises a virtual disk containing one or more layered resources from one or more applications, and wherein the first application layer is shared between multiple users;

loading, by the layering file-filter driver, a file metadata for the first application layer;

mounting a layering write cache associated with the first application layer;

receiving, by the layering driver, one or more file operation requests directed to a layered resource of the one or more layered resources of the one or more applications;

determining, for at least one file open request associated with the one or more file operations, that an instance of the layered resource is located in the layering write cache;

redirecting the at least one file open request to the layering write cache; and presenting to a user prioritized layered resources of the first application layer and the layering write cache in a merged view.

2. The method of claim 1, wherein the first application layer is mounted in a read-only mode and the layering write cache is mounted in a read-write mode.

3. The method of claim 1, further comprising:
redirecting each file create request associated with at least one of the one or more file operation requests to the layering write cache; and
creating, in response to each file create request redirected to the layering write cache, an instance of the layered resource in the layering write cache.

4. The method of claim 1, further comprising:
redirecting each file write request associated with at least one of the one or more file operation requests to the layering write cache.

5. The method of claim 4, further comprising:
determining that the file write request is directed to an instance of the layered resource located in the first application layer; and
creating a copy of the instance of the layered resource in the layering write cache.

6. The method of claim 1, wherein mounting the layering write cache further comprises creating the layering write cache.

7. One or more computer-readable non-transitory storage media embodying logic that is operable when executed to:
register a layering driver with an operating system, wherein the layering driver includes a layering file-filter driver;
mount a first application layer, wherein the first application layer comprises a virtual disk containing one or more layered resources from one or more applications, and wherein the first application layer is shared between multiple users;
load, by the layering file-filter driver, a file metadata for the first application layer;
mount a layering write cache associated with the first application layer;
receive, by the layering driver, one or more file operation requests directed to a layered resource of the one or more layered resources of the one or more applications;
determine, for at least one file open request associated with the one or more file operations, that an instance of the layered resource is located in the layering write cache;
redirect the at least one file open request to the layering write cache; and
present to a user prioritized layered resources of the first application layer and the layering write cache in a merged view.

8. The one or more computer-readable non-transitory storage media of claim 7, wherein the first application layer is mounted in a read-only mode and the layering write cache is mounted in a read-write mode.

9. The one or more computer-readable non-transitory storage media of claim 7, embodying logic that is further operable when executed to:
redirect each file create request associated with at least one of the one or more file operation requests to the layering write cache; and
create, in response to each file create request redirected to the layering write cache, an instance of the layered resource in the layering write cache.

10. The one or more computer-readable non-transitory storage media of claim 7, embodying logic that is further operable when executed to:
redirect each file write request associated with at least one of the one or more file operation requests to the layering write cache.

11. The one or more computer-readable non-transitory storage media of claim 10, embodying logic that is further operable when executed to:
determine that the file write request is directed to an instance of the layered resource located in the first application layer; and
create a copy of the instance of the layered resource in the layering write cache.

12. The one or more computer-readable non-transitory storage media of claim 7, embodying logic that is further operable when executed to:
create the layering write cache.

13. The one or more computer-readable non-transitory storage media of claim 7, embodying logic that is further operable when executed to:
collect, for each enumeration request associated with at least one of the file operation requests, file information from a plurality of mounted layers; and
return a merged collection of the file information.

14. An information handling system comprising:
one or more processors; and
a memory coupled to the processors comprising instructions executable by the processors, the processors being operable when executing the instructions to:
register a layering driver with an operating system, wherein the layering driver includes a layering file-filter driver;
mount a first application layer, wherein the first application layer comprises a virtual disk containing one or more layered resources from one or more applications, and wherein the first application layer is shared between multiple users;
load, by the layering file-filter driver, a file metadata for the first application layer;
mount a layering write cache associated with the first application layer;
create for presentation to a user, by the layering driver, a merged view of prioritized layered resources of the first application layer and the layering write cache;
receive, by the layering driver, one or more file operation requests directed to a layered resource of the one or more layered resources of the one or more applications;
determine, for at least one file open request associated with the one or more file operations, that an instance of the layered resource is located in the layering write cache; and
redirect the at least one file open request to the layering write cache.

15. The information handling system of claim 14, wherein the first application layer is mounted in a read-only mode and the layering write cache is mounted in a read-write mode.

16. The information handling system of claim 14, wherein the memory coupled to the processors further comprise instructions executable by the processors, the processors being operable when executing the instructions to:
redirect each file create request associated with at least one of the one or more file operation requests to the layering write cache; and
create, in response to each file create request redirected to the layering write cache, an instance of the layered resource in the layering write cache.

17. The information handling system of claim 14, wherein the processors being further operable when executing the instructions to:
- redirect each file write request associated with at least one of the one or more file operation requests to the layering write cache.

18. The information handling system of claim 17, wherein the processors being further operable when executing the instructions to:
- determine that the file write request is directed to an instance of the layered resource located in the first application layer; and
- create a copy of the instance of the layered resource in the layering write cache.

19. The information handling system of claim 14, wherein the processors being further operable when executing the instructions to:
- create the layering write cache.

20. The information handling system of claim 14, wherein the processors being further operable when executing the instructions to:
- collect, for each enumeration request associated with at least one of the file operation requests, file information from a plurality of mounted layers; and
- return a merged collection of the file information.

* * * * *